(12) United States Patent
Schwarz et al.

(10) Patent No.: US 11,994,187 B2
(45) Date of Patent: May 28, 2024

(54) FLEXIBLE SPRING ELEMENT MADE OF A FIBRE-REINFORCED PLASTICS COMPOSITE MATERIAL

(71) Applicants: DANTO Invention GmbH & Co. KG, Stockstadt am Rhein (DE); Rheinmetall Invent GmbH, Neuss (DE)

(72) Inventors: Anna Schwarz, Dittelsheim-Heßloch (DE); Tobias Keller, Dittelsheim-Heßloch (DE)

(73) Assignees: DANTO Invention GmbH & Co. KG, Stockstadt am Rhein (DE); Rheinmetall Invent GmbH, Neuss (DE)

( * ) Notice: Subject to any disclaimer, the term of this patent is extended or adjusted under 35 U.S.C. 154(b) by 0 days.

(21) Appl. No.: 17/773,867

(22) PCT Filed: Jan. 30, 2020

(86) PCT No.: PCT/EP2020/052360
§ 371 (c)(1),
(2) Date: May 3, 2022

(87) PCT Pub. No.: WO2021/089192
PCT Pub. Date: May 14, 2021

(65) Prior Publication Data
US 2022/0373054 A1    Nov. 24, 2022

(30) Foreign Application Priority Data
Nov. 4, 2019   (DE) .................. 10 2019 129 581.5

(51) Int. Cl.
*F16F 1/368* (2006.01)
*F16F 1/42* (2006.01)

(52) U.S. Cl.
CPC ............ *F16F 1/368* (2013.01); *F16F 1/422* (2013.01); *F16F 2236/02* (2013.01); *F16F 2238/022* (2013.01)

(58) Field of Classification Search
CPC ........ F16F 1/368; F16F 1/422; F16F 2236/02; F16F 2238/022; F16F 2224/0241; B29C 70/467; B29C 70/547; B29L 2031/774
See application file for complete search history.

(56) References Cited

U.S. PATENT DOCUMENTS 3,968,958 A    7/1976   Huchette et al.
4,688,778 A *  8/1987   Woltron .................. B29C 43/32
                                                         267/148

(Continued)

FOREIGN PATENT DOCUMENTS

DE    102008006411 A1    7/2009
DE    102008057463       7/2016

(Continued)

OTHER PUBLICATIONS

English machined translation of EP-0134617 , (Mar. 1985).*
English machined tranlation of DE-102008057463 B4 (May 27, 2010).*

*Primary Examiner* — Robert A. Siconolfi
*Assistant Examiner* — San M Aung
(74) *Attorney, Agent, or Firm* — Smartpat PLC (57) ABSTRACT

A flexible spring element is made of a fibre-reinforced plastics composite material, a functional layer made of a fibre-reinforced plastics composite material being located on each of two mutually opposite sides of a central plane of the flexible spring element. At least one matrix material discharge layer extending parallel to the two functional layers and in a longitudinal direction is arranged in at least one longitudinal portion and has at least a fraction of discharge layer fibres which are oriented differently from the longitu- (Continued)

dinal direction of the flexible spring element. Within at least one curved portion of the flexible spring element a first volume fraction of flexible spring fibres in the functional layers is smaller, preferably smaller by several % than a second volume fraction of flexible spring fibres in the functional layers within the at least one longitudinal portion.

16 Claims, 3 Drawing Sheets

(56) References Cited

U.S. PATENT DOCUMENTS

| | | | |
|---|---|---|---|
| 4,942,075 A | | 7/1990 | Hartel et al. |
| 2009/0200721 A1 | | 8/2009 | Kobelev et al. |
| 2011/0124243 A1 | | 5/2011 | Park |
| 2018/0216687 A1 | | 8/2018 | Thompson et al. |
| 2018/0245651 A1 | * | 8/2018 | Yoshioka ............... B29C 70/085 |
| 2019/0309814 A1 | * | 10/2019 | Pleyer .................... F16F 1/368 |
| 2022/0178416 A1 | | 6/2022 | Schwarz et al. |

FOREIGN PATENT DOCUMENTS

| | | | | |
|---|---|---|---|---|
| DE | 102015102064 | | 8/2016 | |
| DE | 102015012334 | | 2/2017 | |
| EP | 0005916 A1 | | 12/1979 | |
| EP | 134617 A | * | 3/1985 | ......... B29D 99/0007 |
| GB | 2048429 A | * | 12/1980 | ............ F16F 9/0409 |
| GB | 2349599 A | * | 11/2000 | ........... B29C 70/467 |
| JP | S5790431 A | | 6/1982 | |
| JP | S58118342 B | | 10/1986 | |
| WO | WO-8500207 A1 | * | 1/1985 | |

* cited by examiner

FLEXIBLE SPRING ELEMENT MADE OF A FIBRE-REINFORCED PLASTICS COMPOSITE MATERIAL

TECHNICAL FIELD

The disclosure relates to a flexible spring element made of a fibre-reinforced plastics composite material.

BACKGROUND

A flexible spring element can be designed in one piece and can form a flexible spring or a flexible spring device. It is also possible that a plurality of flexible spring elements are combined to form a flexible spring device and are brought into operative connection with each other. A single flexible spring element can, for example, be beam-shaped and can have a straight or slightly curved course. Flexible spring elements are also known which have a complex curved course and, for example, a C-shaped or S-shaped design or a plurality of alternating and meandering curvatures.

Flexible spring elements can be made of different materials. Conventional flexible spring elements, for example, are often made of a suitable spring steel. Such flexible spring elements can be produced at low cost, wherein the shaping of the flexible spring elements can be adapted to the particular task. Flexible spring elements made of spring steel or another suitable metal are resistant and have advantageous spring properties.

It is also known and has already been tried and tested for various fields of application to produce flexible spring elements from a suitable fibre-reinforced plastics composite material. Here, a fibre-reinforced plastics composite material is usually used in which quasi-endless fibres are embedded in a suitable matrix material made of plastic. Advantageous spring properties can be favoured by the arrangement and orientation of the individual fibres, which are mainly responsible for a transfer of tensile and compressive forces along the flexible spring element. Here, tensile or compressive forces are transferred mainly via the flexible spring fibres in the functional layers, depending on the deformation. By contrast, no tensile or compressive forces occur in the central plane, which is also referred to as the neutral fibre or zero line, under intended deformation. The functional layers arranged on both sides of the central plane can be produced uniformly and can merge into each other, resulting in a one-piece flexible spring element made of a homogeneous fibre-composite material. Compared to flexible spring elements made of metal, flexible spring elements made of a fibre-reinforced plastics composite material can have a lower weight and a better resistance to environmental conditions and in particular to moisture. Flexible spring elements made of a suitable fibre-reinforced plastics composite material can advantageously be used in motor vehicles.

If the flexible spring element is designed with a uniform thickness or with a uniform distance between the two functional layers, the thickness of the flexible spring element must be adapted to the tensile and compressive loads that can occur when the maximum intended force is applied to the curved portion of the flexible spring element. A significantly lower load occurs here in an adjacent longitudinal portion, so that the flexible spring element is oversized with a uniform thickness in this longitudinal portion. The weight of the flexible spring element as well as the material cost would then be excessively high, which is considered to be disadvantageous, especially with regard to a lightweight construction with fibre-reinforced plastics composite materials that is usually sought.

The production of flexible spring elements from a fibre-reinforced plastics composite material is often associated with a high production effort and thus with high production costs. Here, especially in the case of flexible spring elements with a varying thickness, the effort required to prepare a large number of prefabricated strips of fibre-reinforced plastics composite material or prepregs of different lengths, arrange them in a tool mould and then press them is quite considerable and often decisive in terms of production costs.

A flexible spring element designed substantially as a flat leaf spring is described, for example, in U.S. Pat. No. 3,968,958. The assembly of the prefabricated prepregs of different lengths and in particular their arrangement in a tool mould as well as their fixation during the curing process of the prepregs in the tool mould, which takes place under pressure, is associated with a considerable effort that can often only be carried out manually. Due to the shorter additional middle layers arranged between the outer functional layers, a middle portion of the leaf spring is additionally reinforced.

SUMMARY

It is therefore considered to be an object of the present disclosure to design a flexible spring element made of a plastics composite material in such a way that the flexible spring element can be produced inexpensively, can be adapted in a simple manner in various portions to the loads that normally occur and can have the most advantageous spring properties possible.

The object is achieved by a flexible spring element made of a fibre-reinforced plastics composite material, wherein the flexible spring element has a functional layer made of a fibre-reinforced plastics composite material on each of two mutually opposite sides of a central plane, wherein flexible spring fibres in the functional layers are oriented parallel to one another at least in bundles and run in a longitudinal direction of the flexible spring element, wherein the flexible spring element has at least one curved portion, in which the central plane of the unloaded flexible spring element running between the two functional layers runs curved by more than 90° in the longitudinal direction of the flexible spring element, wherein the flexible spring element has at least one longitudinal portion in which the central plane of the unloaded flexible spring element has either no appreciable curvature or a curvature reversal, and wherein, when the flexible spring element is deflected as intended, a functional layer portion arranged in the curved portion and directed outwards is subjected to tensile stress and a functional layer portion arranged oppositely in the curved portion and directed inwards is subjected to compressive stress The flexible spring element has, in the at least one longitudinal portion, at least one matrix material discharge layer which runs parallel to the two functional layers and in the longitudinal direction and which has at least a fraction of discharge layer fibres which are oriented differently from the longitudinal direction of the flexible spring element, and in that, within the at least one curved portion, a first volume fraction of flexible spring fibres in the functional layers is smaller, preferably smaller by several % than a second volume fraction of flexible spring fibres in the functional layers within the at least one longitudinal portion.

It has been shown that particularly advantageous spring properties can be made possible in a simple manner with low material and production costs by adapting the volume fraction of flexible spring fibres in the functional layers along the longitudinal direction of the flexible spring element in sections to the loads that normally occur, and in particular by the volume fraction of flexible spring fibres in the longitudinal portions being higher, and possibly significantly higher than in the at least one curved portion. In an advantageous manner, it is provided that the volume fraction of flexible spring fibres is higher in all longitudinal portions than in all curved portions. Due to the different volume fraction of the flexible spring fibres in the longitudinal portions compared to the curved portions, properties important for the flexible spring, such as the flexural rigidity or torsional rigidity, can be specified differently and adapted to the particular function of the longitudinal portions and curved portions.

A flexible spring element can be produced, for example, by placing preconfigured prepregs with unidirectional, endless flexible spring fibres oriented in the longitudinal direction of the flexible spring element into a tool mould. If necessary, the prepregs are impregnated with additionally added matrix material and are heated and compressed until the matrix material cures. It has been shown that the still flowable matrix material within the functional layers flows substantially along the flexible spring fibres embedded therein, and transversely thereto the matrix material can flow at a significantly lower flow rate, since the flexible spring fibres obstruct and retain the matrix material.

In order to be able to specify the volume fraction of flexible spring fibres differently in different portions of the flexible spring element, it is provided that a matrix material discharge layer is arranged in portions with a higher volume fraction and, during compression of the flexible spring element during a curing process of a matrix material, has a substantially lower flow resistance transversely to the longitudinal direction compared to the adjacent functional layers. As a result, during pressing, the still flowable matrix material in the longitudinal portions can first flow into the matrix material discharge layer and then can quickly flow out laterally from the flexible spring element, while in the curved portions it can flow substantially along the longitudinal direction of the flexible spring element through the flexible spring fibres oriented in the longitudinal direction into the functional layers, but cannot escape laterally or in any case can only do so to a small extent. Due to an increased discharge of matrix material within the longitudinal portions, the fraction of flexible spring fibres is increased there compared to the matrix material, while the fraction of flexible spring fibres relative to the matrix material in the curved portions hardly changes during pressing and is decisively determined by the preconfigured prepregs and, if necessary, an additional addition of matrix material.

The use of a matrix material discharge layer has proven to be much more effective and more controllable than other methods, such as varying the pressing force along the longitudinal direction of the flexible spring element. In addition, the functional layers of the flexible spring element can be composed of continuous strips of a uniform prepreg material extending along the entire length of the flexible spring element, without having to specify and insert different prepregs or a different number of prepreg layers in sections. It is also possible to use only prepregs with endless flexible spring fibres extending in the longitudinal direction over the entire flexible spring element, whereby high-quality flexible spring elements can be produced with a low material cost.

According to an embodiment, it is provided that the first volume fraction of flexible spring fibres in the at least one curved portion is less than 55%, preferably less than 52%, and that the second volume fraction of flexible spring fibres in the at least one longitudinal portion is greater than 55%, preferably greater than 58%. It has been shown that a volume fraction of flexible spring fibres within the curved portions of about 50% as well as a volume fraction of flexible spring fibres within the longitudinal portions of about 60% enables advantageous properties of the flexible spring element for many applications with a comparatively very low inherent weight of the flexible spring element.

The matrix material discharge layer can consist of different materials or can be composed of different material components. An essential requirement for a particularly suitable matrix material discharge layer is a comparatively high porosity and a high deformation resistance, so that the matrix material discharge layer is not excessively compressed and compacted during pressing, so that the flowable matrix material can flow quickly through cavities within the matrix material discharge layer until it can escape laterally.

Advantageously, the matrix material discharge layer can comprise discharge layer fibres oriented in two or more directions running at an angle to each other, wherein an averaged orientation of the discharge layer fibres is oriented in the longitudinal direction of the flexible spring element. The averaged orientation of the discharge layer fibres is a direction that would be given from an overlaying of all individual orientations of the individual discharge layer fibres. The averaged orientation corresponds, for example, to the longitudinal direction of the flexible spring element when equal numbers of discharge layer fibres are oriented and run in the longitudinal direction in the same manner towards a first longitudinal edge and towards an opposite, second longitudinal edge of the flexible spring element. For example, the discharge layer fibres can be oriented at an angle of 90° relative to each other. In order to avoid a preferred direction being specified for the matrix material during pressing transversely to the longitudinal direction, which could lead to an inhomogeneity of the fraction of flexible spring fibres formed transversely to the longitudinal direction, the discharge layer fibres should be oriented symmetrically to both longitudinal edges, for example should each have an angle to the longitudinal edges of 45°, or should be oriented either longitudinally or transversely to the longitudinal direction of the flexible spring element. The fraction of discharge layer fibres oriented transversely to the longitudinal direction of the flexible spring element reduces the flow resistance transversely to the longitudinal direction, so that more matrix material flows transversely to the longitudinal direction and can exit laterally. It is also conceivable that the discharge layer fibres within the matrix material discharge layer are oriented at an angle between 0° and 90° to the longitudinal direction, equally distributed towards both longitudinal sides, for example having an angle of +20° or −20° relative to the longitudinal direction.

According to an advantageous embodiment, it is consequently provided that the discharge layer fibres in the matrix material discharge layer have an isotropic orientation. The discharge layer fibres can be arranged non-directionally within the matrix material discharge layer. Comparatively short discharge layer fibres can also be used in the matrix material discharge layer. Optionally, an average length of the discharge layer fibres in the matrix material discharge layer can be less than a width of the flexible spring element measured transversely to the longitudinal direction. The average length of the discharge layer fibres can also be significantly shorter than a width of the flexible spring element measured transversely to the longitudinal direction of the flexible spring element and can, for example, be only a few millimetres.

The matrix material discharge layer can be, for example, a laid scrim or a knitted fabric. It can also be a textile. In a particularly advantageous manner, it is provided that the matrix material discharge layer comprises a non-woven material. The individual discharge layer fibres can be bonded in various ways with or without a matrix material to form the non-woven material. The non-woven material can be impregnated with the same matrix material as the functional layers or with a different matrix material.

It has been shown that the use of a non-woven material with a weight per unit area of less than 200 g/m$^2$, preferably less than 120 g/mm$^2$, and particularly preferably less than 80 g/mm$^2$ is particularly advantageous.

According to one embodiment, it is provided that in the at least one curved portion of the flexible spring element, there is provided a distance widening element made of a different material than the two functional layers and disposed between the two functional layers. The distance widening element can increase a thickness of the flexible spring element measured transversely to the longitudinal direction of the flexible spring element. The deformation forces occurring due to the bending stress of the flexible spring element under a specified load can be absorbed particularly advantageously by the distance widening element from a curved portion thickened thereby and converted into spring energy. By increasing a distance between the functional layers measured transversely to the longitudinal direction and thus a distance between the functional layers and the central plane and the neutral fibre running therein, the flexible spring element has a greater resistance to deformation in the curved portion than in an adjacent longitudinal portion, without having to arrange additional middle layers between the functional layers for this purpose, which only extend over the curved portion.

The distance widening element arranged in the curved portion between the two functional layers has a continuously changing thickness in the longitudinal direction, so that the distance widening element, starting from a pointed first end, becomes continuously thicker and has a maximum thickness in a middle region, in order to increasingly taper towards the opposite, second end and also end again in a point. In this way, abrupt changes in thickness in the flexible spring element can be avoided, which experience has shown can lead to load peaks and an often very high and possibly excessive stress during intended use of the flexible spring element.

It is advantageous if the distance widening element is produced from a material that is as shear-resistant and shear stiff as possible. It is basically conceivable that the distance widening element is made of wood or a suitable plastics material, for example. The distance widening element can be prefabricated or produced in advance, wherein the distance widening element expediently already has a shaping that is adapted to a shape or to a course of the unloaded flexible spring element within the curved portion.

According to an advantageous embodiment, it is provided that the material of the distance widening element is a second fibre-reinforced plastics composite material with fibres of which the length is in each case less than 30 mm, preferably less than 10 mm, and particularly preferably less than 1 mm. The second fibre-reinforced plastics composite material with such short fibres can be processed particularly advantageously and cost-effectively and brought into the desired shaping for the distance widening element. The individual fibres are not able to transmit tensile or compressive forces over large areas, but this has been found to be unnecessary. By arranging a distance widening element between two outer functional layers, in the curved portion a thickness of the flexible spring element measured transversely to a longitudinal direction of the flexible spring element can be adapted to the intended bending stress of the flexible spring element and can be designed to be considerably thicker than the total thickness of the two functional layers. The distance widening element produced from a second fibre-reinforced plastics composite material can have a low inherent weight. Due to the additional second fibre-reinforced plastics composite material of the distance widening element, the two substantially more costly functional layers of the flexible spring element in the curved portion can be formed to be comparatively thin and adapted to the intended or maximum expected tensile and compressive stress of the functional layers of the flexible spring element within the curved portion.

It has been found that the flexible spring element has particularly advantageous spring properties when the fibres in the second fibre-reinforced composite plastics material are arranged in a non-directional manner. Such a non-directional arrangement of the fibres embedded in the matrix material of the second fibre-reinforced composite plastics material is also referred to as random fibres. In many applications, the more homogeneously the fibres are distributed in the second fibre-reinforced composite plastics material, the more advantageously the spring properties can be made. The shorter the length of the individual fibres in the second fibre-reinforced plastics composite material, the easier it is to achieve a homogeneous distribution of the fibres in the distance widening element and a homogeneously distributed orientation of the individual fibres with respect to each other.

According to a particularly advantageous embodiment, it is provided that the second fibre-reinforced plastics composite material comprises a plastics matrix material corresponding to the two functional layers. By using the same plastics matrix material for the functional layers and for the distance widening element arranged between the functional layers, an integrally bonded and transition-free connection of the distance widening element to the functional layers adjoining on both sides can be effected. Unintentional detachment of the functional layers from the distance widening element is thus avoided and at least made more difficult, even under high loads on the flexible spring element.

A distance widening element can be produced by introducing a pasty starting material between already prefabricated and possibly preformed functional layers. Depending on the material used, the distance widening element can also be produced here by already known injection moulding processes. Subsequently, the functional layers can be joined together with the distance widening element arranged in between, thereby producing the desired flexible spring element. The distance widening element can also be introduced into the curved portion by already known injection moulding processes between the functional layers already arranged in a tool mould. It is also conceivable that the distance widening element is produced separately from the functional layers in a separate work step. Subsequently, the functional layers can be joined together with the distance widening element arranged in between and can be formed and solidified into the desired flexible spring element.

Optionally, it is provided that the central plane in the at least one curved portion of the flexible spring element has a change of direction of more than 90°, preferably of more than 150°, and particularly preferably of approximately 180°. In the case of a curved portion of which the course in the longitudinal direction changes by more than 150° and preferably by approximately 180°, a force effect directed transversely to the two end regions of the curved portion can be absorbed particularly effectively by a deformation of the flexible spring element within the curved portion as intended, and a high spring restoring force and thus a large spring effect can be produced with a small spatial requirement.

In an advantageous manner, it is provided that the flexible spring element has at least two curved portions separated from each other by a longitudinal portion and curved in different directions, so that the central plane has an S-shaped course over these two curved portions. Flexible spring elements with at least one S-shaped spring portion and in particular flexible spring elements with two or more S-shaped spring portions adjoining each other allow a particularly advantageous combination of a high spring force with the smallest possible spatial requirement for many applications. A plurality of similar or identical flexible spring elements can be combined to form a flexible spring device which combines advantageous spring properties with a high resistance to environmental influences and with a low inherent weight. A flexible spring element or a flexible spring device combined from a plurality of flexible spring elements is therefore also and in a special way suitable for use as a spring element in motor vehicles.

The functional layers have particularly advantageous properties if the first fibre-reinforced plastics composite material of the two functional layers comprises fibres unidirectionally oriented in the longitudinal direction of the flexible spring element. Due to the fibres oriented unidirectionally and in the longitudinal direction, the functional layers can absorb particularly high tensile and compressive forces. In this context, the functional layers can have fibres or fibre bundles either running parallel to the longitudinal direction or running at an angle, preferably an acute angle to the longitudinal direction. Suitable fibres can be, for example, glass fibres, carbon fibres, ceramic fibres, basalt fibres, metal fibres or natural fibres. A suitable matrix material can be a plastics material adapted to the corresponding fibres, such as a suitable thermoset material, elastomer or thermoplastic. The distance widening element can have the same fibres as the functional layers or fibres made of a different material.

Optionally, it is provided that the first fibre-reinforced plastics composite material comprises fibres of which the length extends in the longitudinal direction over the entire flexible spring element. A tensile or compressive stress acting on the functional layers is thus distributed by the quasi-endless fibres over the entire flexible spring element, thereby reducing the risk of breakage in the event of excessive loading.

BRIEF DESCRIPTION OF THE DRAWINGS

In the following, an exemplary embodiment is explained in more detail and is shown schematically in the drawing, in which.

DETAILED DESCRIPTION

Figure 1:
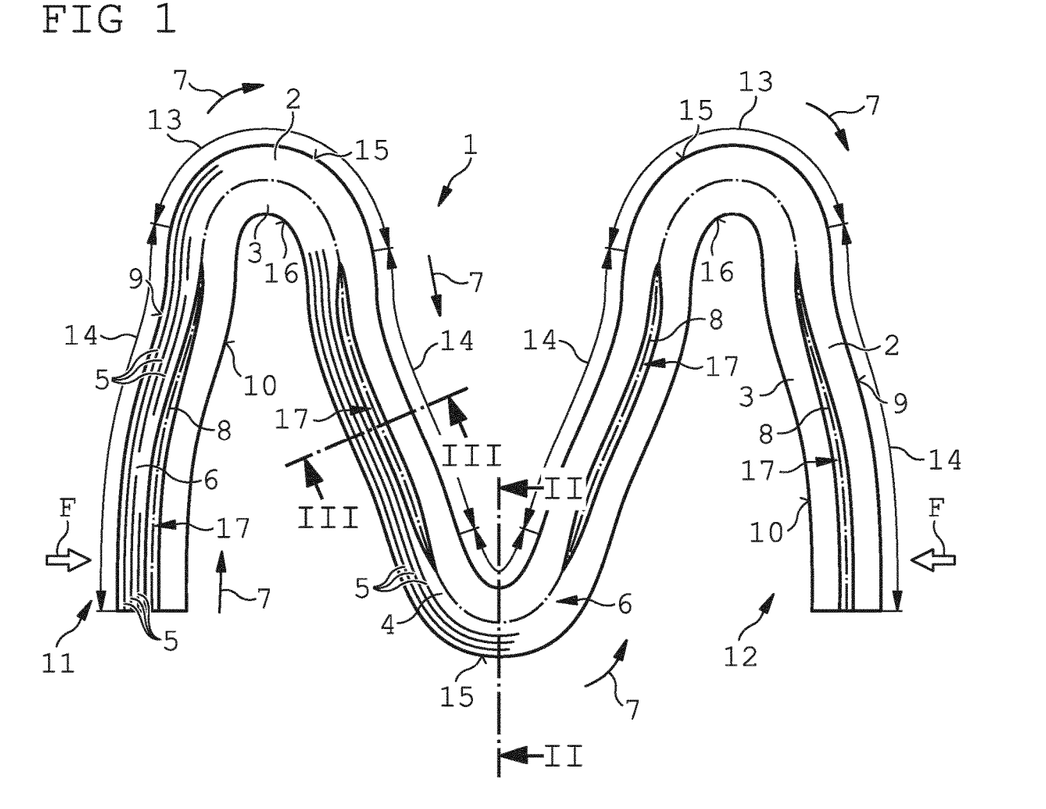
FIG. 1 shows a schematic sectional view of a flexible spring element with a meandering course with a plurality of curved portions and longitudinal portions.
Figure 2:
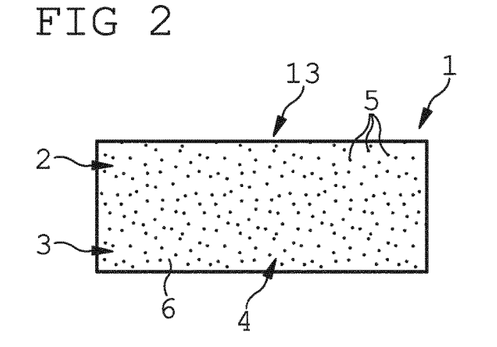
FIG. 2 shows a schematic sectional view of the flexible spring element shown in FIG. 1 along a line II-II in FIG. 1.
Figure 3:
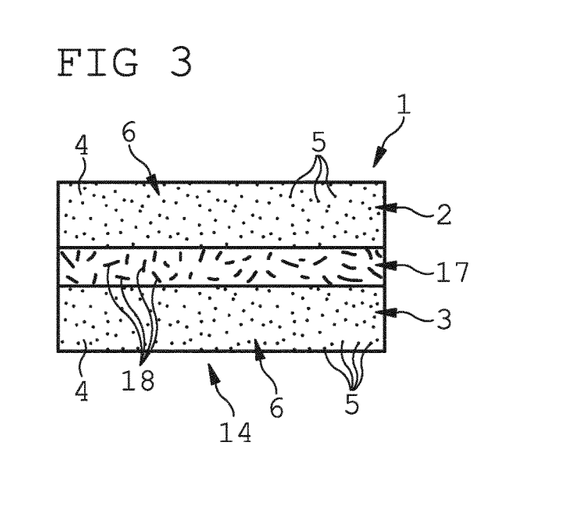
FIG. 3 shows a schematic sectional view of the flexible spring element shown in FIG. 1 along a line in FIG. 1.

A flexible spring element 1 shown in various views in FIGS. 1 to 3 has two functional layers 2, 3, each made of a first fibre-reinforced plastics composite material 4. In each of the two functional layers 2, 3, endless flexible spring fibres 5 are arranged in a matrix material 6 made of plastic in such a way that the flexible spring fibres 5 extend in a longitudinal direction 7 over the entire flexible spring element 1. In FIG. 1, only some flexible spring fibres 5 are shown for illustration purposes and only over a short portion in the longitudinal direction 7. The longitudinal direction 7 corresponds to the course of a central plane 8 which runs between two outwardly directed outer sides 9, 10 of the two functional layers 2, 3, in each case at an equal distance from the two outer sides 9, 10. In the exemplary embodiment shown, the course of the central plane 8 also corresponds to the course of a neutral fibre which is not loaded when an intended force F is applied transversely to the longitudinal direction 7 to both end regions 11, 12 of the flexible spring element 1.

The central plane 8 has a meandering course. The flexible spring element 1 has three curved portions 13 with a curved course that changes by about 180°, each of said curved portions being arranged between two longitudinal portions 14. The two end regions 11, 12 are each formed by a longitudinal portion 14, in which the flexible spring element 1 has an approximately straight or very flat and only slightly S-shaped course of the central plane 8. Between the three curved portions 13, a longitudinal portion 14 is also formed, in which the central plane 8 runs approximately straight or slightly S-shaped and has a curvature reversal from a first curved portion 13 to an adjacent, second curved portion 13.

The flexible spring fibres 5 embedded in the matrix material 6 of the functional layers 2, 3 run substantially parallel to the respective outer sides 9, 10 of the functional layers 2, 3 and extend in the longitudinal direction 7 over the entire flexible spring element 1. The orientation of the individual fibres 5 is consequently perpendicular to the drawing plane in the sectional views shown in FIGS. 2 and 3 and runs in the drawing plane in the sectional view shown in FIG. 1. When a force F is applied as intended to the flexible spring element, the flexible spring fibres 5 are subjected to tensile stress along the outer side portions 15 directed outwards in the curved portions 13 and to compressive stress along the outer side portions 16 directed inwards in the curved portions 13. The closer the flexible spring fibres 5 are arranged to the outer sides 9, 10, the higher are the tensile or compressive forces acting on the flexible spring fibres 5 during an intended deformation.

In the longitudinal portions 14, a matrix material discharge layer 17 is arranged between each of the two functional layers 2, 3 in the region of the central plane 8. The matrix material discharge layer 17 consists of a non-woven layer less than 1 mm thin with a weight per unit area of approximately 100 g/mm2. The non-woven layer consists of a consolidated web of discharge layer fibres 18, which are evenly distributed in the non-woven layer and are oriented in a non-directional and isotropic or random and non-rectilinear manner. In the figures, the matrix material discharge layer 17 is not shown to scale and is shown significantly thicker for clarity.

FIG. 2 shows a sectional view through a curved portion 13 of the flexible spring element 1. The two functional layers 2, 3 are not separated from each other, but are formed in one piece and without an interface to each other, so that the flexible spring element 1 in the curved portion 13 consists of a homogeneously formed fibre composite material, wherein the flexible spring fibres 5 are oriented perpendicularly to the drawing plane.

FIG. 2 shows a sectional view through a longitudinal portion 14 of the flexible spring element 1. The material matrix discharge layer 17 or the non-woven layer is arranged between the two functional layers 2, 3. The individual discharge layer fibres 18 run randomly and non-directionally within the matrix material discharge layer 17.

Figure 4:
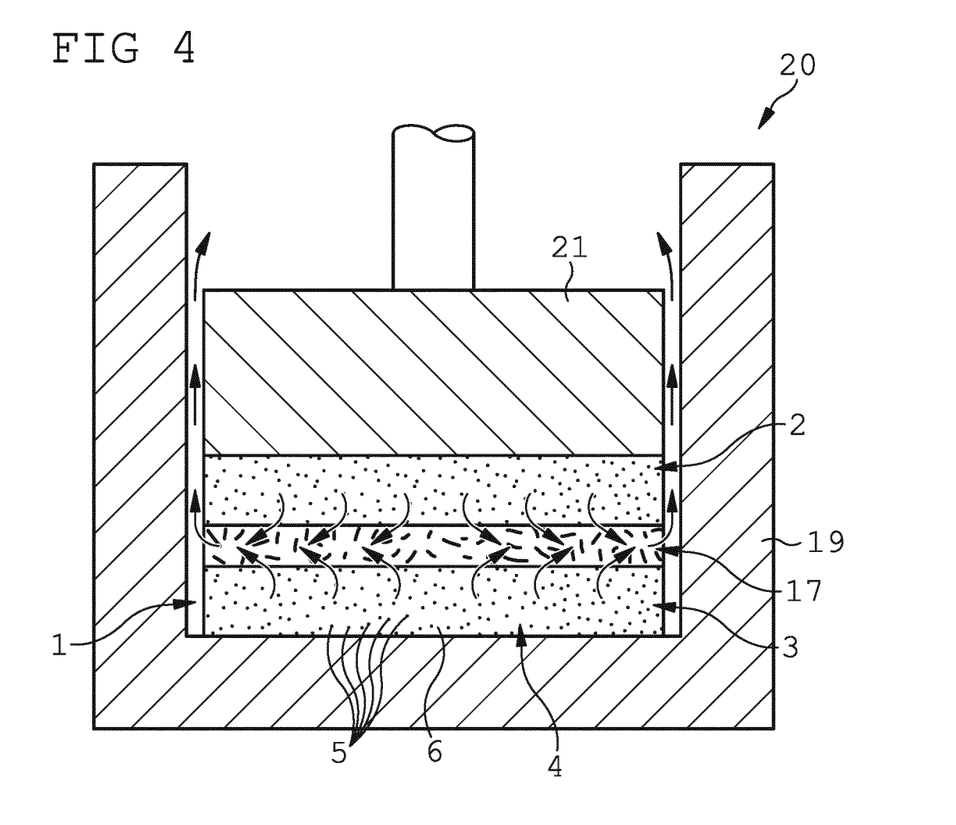
FIG. 4 shows a schematic representation of a sectional view of a longitudinal portion of a flexible spring element during pressing in a tool mould.

In order to produce the flexible spring element 1, a number of prepregs with endless flexible spring fibres 5 oriented unidirectionally in the longitudinal direction 7 are inserted into a U-shaped lower part 19 of a tool mould 20 for each functional layer 2, 3. The matrix material discharge layer 17 is inserted and arranged between the two functional layers 2, 3. For pressing the flexible spring element 1, a pressure plunger 21 of the tool mould 20 is inserted into the lower part 19 and the flexible spring element 1 is pressed together between the pressure plunger 21 and the lower part 19 of the tool mould 20. During a curing process, the initially liquid matrix material 6, usually a suitable resin, is solidified and cured to form the flexible spring element 1 having the desired properties.

The still flowable matrix material 6 is first absorbed by the matrix material discharge layer 17. The pressing causes additional matrix material 6 to flow into the matrix material discharge layer 17. Since the matrix material 6 can flow within the matrix material discharge layer particularly quickly and with a comparatively low flow resistance, transversely to the longitudinal direction 7, and thus, in FIG. 4, in a direction in the drawing plane, the matrix material 6 flows laterally out of the matrix material discharge layer 17 as the compression pressure increases and is pressed out of the mould 20 through a gap between the pressure plunger 21 and the surrounding lower part 19 of the tool mould 20, as indicated by the arrows in FIG. 4. In the process, significantly more matrix material 6 is pressed out and discharged laterally within the longitudinal portions 14, due to the matrix material discharge layer 17 only being arranged there, than within the curved portions 13. The remaining volume fraction of the matrix material 6 in the longitudinal portions 14 is thus lower than in the curved portions 13. As a result, the volume fraction of the flexible spring fibres 5 in the curved portions 13 is lower than in the longitudinal portions 14.

Figure 5:
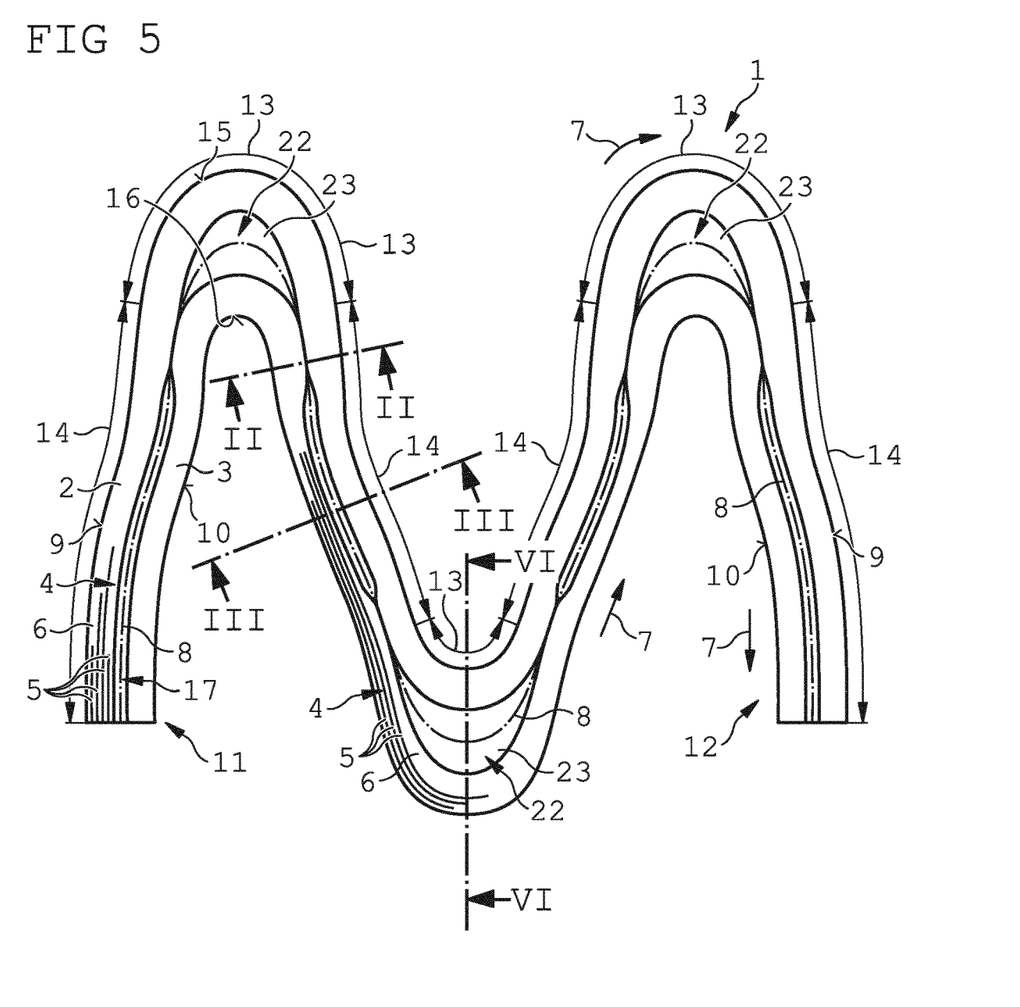
FIG. 5 shows a schematic sectional view of a differently designed flexible spring element with a plurality of curved portions and longitudinal portions, wherein a distance widening element is arranged in each of the curved portions and within the relevant curved portions increase a thickness of the flexible spring element measured transversely to the longitudinal direction.

In the embodiment of a differently designed flexible spring element 1 with a plurality of curved portions 13 and longitudinal portions 14, which is only shown schematically in FIG. 5, a distance widening element 22 is arranged in each of the curved portions 13 and increases a thickness of the flexible spring element 1 measured transversely to the longitudinal direction 7 within each curved portion 13. The distance widening element 22 causes a greater distance between the outwardly directed outer side portions 15 and the inwardly directed outer side portions 16 of the two functional layers 2, 3 within the curvature portions 13 and thereby brings about advantageous spring properties of the flexible spring element 1 in the region of the relevant curvature portion 13.

The distance widening elements 22 have an approximately crescent-shaped design. The distance widening element 22 arranged in a particular curved portion 13 between the two functional layers 2, 3 has a continuously changing thickness in the longitudinal direction 7, so that the distance widening element 22, starting from a pointed first end, becomes continuously thicker and has a maximum thickness in a middle region, in order to increasingly taper towards the opposite second end and also end again at a point. In this way, abrupt changes in thickness in the flexible spring element 1 can be avoided, which experience has shown can lead to load peaks and an often very high and possibly excessive stress during intended use of the flexible spring element 1. The two distance widening elements 22 do not necessarily have to be symmetrical to the central plane 8.

Each of the distance widening elements 22 is produced from a second fibre-reinforced plastics composite material 23. The second fibre-reinforced plastics composite material 23 has the same matrix material 6 as the first fibre-reinforced plastics composite material 4, so that the distance widening elements 22 bond integrally and homogeneously to the two adjoining functional layers 2, 3, without the formation of interfaces between the distance widening elements 22 and the adjoining functional layers 2, 3, which could possibly impair the mechanical strength of the flexible spring element 1.

Figure 6:
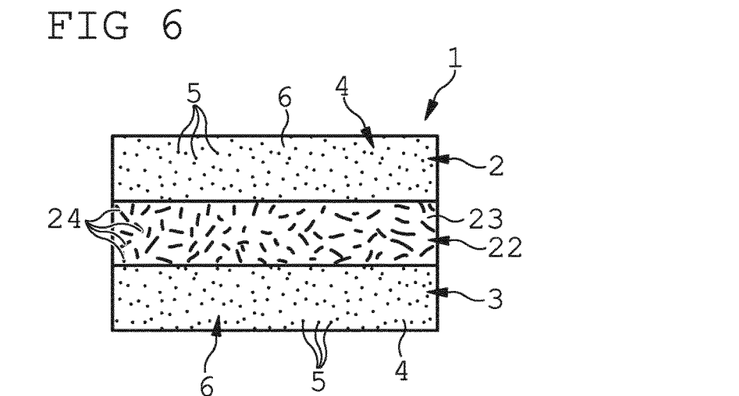
FIG. 6 shows a schematic sectional view of the flexible spring element shown in FIG. 5 along a line VI-VI in FIG. 5.

The sectional views II-II and shown in FIG. 5 correspond to the sectional views shown in FIGS. 2 and 3. FIG. 6 shows a sectional view VI-VI in a curved portion 13 with a distance widening element 22 embedded therein along a sectional line VI-VI in FIG. 5. Short fibres 24 of preferably uniform length between 1 mm and 5 mm are arranged in the matrix material 6 of the second fibre composite material 23. The short fibres 24 are oriented in a non-directional manner in the distance widening elements 22, so that there is a substantially homogeneous distribution and a distribution oriented in all directions of the short fibres 23 in the matrix material 6 of the second fibre-reinforced composite plastics material 23.

The dimensions of the distance widening elements 22 are dimensioned, in particular with regard to the thickness transversely to the course of the central plane 8, in such a way that the flexible spring element 1 has advantageous spring properties within the intended range of the normally occurring force action, and damage to the flexible spring element 1 is largely excluded. At the same time, the functional layers 2, 3 are also dimensioned in such a way that the intended use of the flexible spring element 1 is possible over the intended period of use and yet as little material as possible is used for the functional layers 2, 3 and the distance widening elements 22, so that the flexible spring element 1 has advantageous spring properties with a particularly low inherent weight.

The invention claimed is:

1. A flexible spring element (1) made of a fibre-reinforced plastics composite material (4, 23),
   wherein the flexible spring element (1) comprises two functional layers (2, 3), in each case one functional layer (2, 3) made of a fibre-reinforced plastics composite material (4) on two mutually opposite sides (9, 10) of a central plane, wherein flexible spring fibres (5) in the functional layers (2, 3) are oriented parallel to one another at least in bundles and run in a longitudinal direction (7) of the flexible spring element, wherein the flexible spring element (1) comprises at least one curved portion (13), in which the central plane (8) of the flexible spring element (1) running between the two functional layers (2, 3) runs curved by more than 90° in the longitudinal direction (7) of the flexible spring element (1) when unloaded, wherein the flexible spring element (1) comprises at least one longitudinal portion (14) in which the central plane (8) of the flexible spring element (1) has either no appreciable curvature or a curvature reversal when unloaded, and wherein, when the flexible spring element (1) is deflected as intended, a functional layer portion (15) arranged in the curved portion (13) and directed outwards is subjected to tensile stress and a functional layer portion (16) arranged oppositely in the curved portion (13) and directed inwards is subjected to compressive stress, wherein the flexible spring element (1) comprises, in the at least one longitudinal portion (14), at least one material matrix discharge layer (17) which runs parallel to the two functional layers (2, 3) in the longitudinal direction, extends from a first longitudinal edge to an opposite second longitudinal edge of the flexible spring element (1) in a transverse direction, and which comprises at least a fraction of discharge layer fibres (18) which are oriented differently from the longitudinal direction (7) of the flexible spring element (1), wherein the at least one material matrix discharge layer (17) is configured to facilitate a lateral discharge of liquid matrix material from the longitudinal portion (14) during production of the flexible spring element (1), and wherein, within the at least one curved portion (13), a first volume fraction of flexible spring fibres (5) in the functional layers (2, 3) is smaller than a second volume fraction of flexible spring fibres (5) in the functional layers (2, 3) within the at least one longitudinal portion (14).

2. The flexible spring element (1) according to claim 1,
wherein the first volume fraction of flexible spring fibres (5) in the at least one curved portion (13) is less than 52%, and
wherein the second volume fraction of flexible spring fibres (5) in the at least one longitudinal portion (14) is greater than 58%.

3. The flexible spring element (1) according to claim 1,
wherein the matrix material discharge layer (17) comprises discharge layer fibres (18) oriented in two or more directions running at an angle to each other, wherein an averaged orientation of the discharge layer fibres (18) is oriented in the longitudinal direction (7) of the flexible spring element (5).

4. The flexible spring element (1) according to claim 1,
wherein the matrix material discharge layer (17) comprises discharge layer fibres (18) oriented in two discharge layer fibre directions oriented at an angle of 90° relative to each other.

5. The flexible spring element (1) according to claim 1,
wherein the discharge layer fibres (18) in the matrix material discharge layer (17) have an isotropic orientation.

6. The flexible spring element (1) according to claim 3,
wherein the matrix material discharge layer (17) comprises a non-woven material.

7. The flexible spring element (1) according to claim 6,
wherein the non-woven material has a weight per unit area of less than 80 g/mm$^2$.

8. The flexible spring element (1) according to claim 1,
wherein an average length of the discharge layer fibres (18) in the matrix material discharge layer (17) is less than a width of the flexible spring element (1) measured transversely to the longitudinal direction (7).

9. The flexible spring element (1) according to claim 1,
wherein the flexible spring element (1) has, in the at least one curved portion (13), a distance widening element (22) made of a different material than the two functional layers (2, 3) and disposed between the two functional layers (2, 3).

10. The flexible spring element (1) according to claim 9,
wherein the material of the distance widening element (22) is a second fibre-reinforced plastics composite material (23) with fibres (24) of which a length is in each vase less than 1 mm.

11. The flexible spring element (1) according to claim 10,
wherein the fibres (24) in the second fibre-reinforced plastics composite material (23) are arranged in a non-directional manner.

12. The flexible spring element (1) according to claim 10,
wherein the second fibre-reinforced composite plastics material (23) comprises a matrix material (6) corresponding to the two functional layers (2, 3).

13. The flexible spring element (1) according to claim 1,
wherein the central plane (8) in the at least one curved portion (13) of the flexible spring element (1) has a change of direction of more than 150°.

14. The flexible spring element (1) according to claim 1,
wherein the flexible spring element (1) has at least two curved portions (13) separated from each other by a longitudinal portion (14) and curved in different directions, so that the central plane (8) has an S-shaped course over these two curved portions (13).

15. The flexible spring element (1) according to claim 1,
wherein a first fibre-reinforced plastics composite material (4) of the two functional layers (2, 3) comprises flexible spring fibres (5) unidirectionally oriented in the longitudinal direction (7) of the flexible spring element (1).

16. The flexible spring element (1) according to claim 15,
wherein the first fibre-reinforced plastics composite material (4) comprises flexible spring fibres (5) of which a length extends in the longitudinal direction (7) over the entire flexible spring element (1).

* * * * *